(12) United States Patent
Tokutsu et al.

(10) Patent No.: US 7,046,191 B2
(45) Date of Patent: May 16, 2006

(54) RADAR ANGLE CORRECTION METHOD

(75) Inventors: Masahiro Tokutsu, Kobe (JP); Tokio Shinagawa, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 0 days.

(21) Appl. No.: 10/856,587

(22) Filed: May 28, 2004

(65) Prior Publication Data

US 2004/0239557 A1    Dec. 2, 2004

(30) Foreign Application Priority Data

May 30, 2003    (JP) ............................. 2003-155625

(51) Int. Cl.
*G01S 7/40*    (2006.01)
(52) U.S. Cl. ................... 342/165; 342/173; 342/174
(58) Field of Classification Search ................ 342/165, 342/173, 174, 70, 71, 72; 343/872
See application file for complete search history.

(56) References Cited

U.S. PATENT DOCUMENTS 6,844,843 B1 *    1/2005    Ishii et al. ................... 342/165

FOREIGN PATENT DOCUMENTS

| JP | 2002-22833 | 1/2002 |
|----|------------|--------|
| JP | 2003-69355 | 3/2003 |

OTHER PUBLICATIONS

Patent Abstract of Japan Publication No. 2002022833 A, Published Jan. 23, 2002 in the name of Hoashi Yoshiaki.
Patent Abstract of Japan Publication No. 2003069355 A, Published Mar. 7, 2003 in the name of Kamiide Koji.

* cited by examiner

*Primary Examiner*—Daniel Pihulic
(74) *Attorney, Agent, or Firm*—Christie, Parker and Hale, LLP

(57) ABSTRACT

The present invention relates to a radar unit and provides a radar angle correction method for correcting an error in a radar angle caused by the front cover of an antenna. The radar angle correction method comprises the steps of: measuring a peak power of a beam received from a reference target at each of a plurality of radar angles; plotting a theoretical quadratic curve whose beam width corresponds to a value specified for the radar and whose peak indicates an average of peak values; adopting a difference between a theoretical value indicated by the theoretical quadratic curve and a received beam power as a correction value with which the received beam is corrected; and subtracting the correction value from the received beam power.

5 Claims, 8 Drawing Sheets

FIG. 8

| rd_ang[°] \ BEAM No. | 3 | 4 | 5 | 6 | 7 | 8 | 9 | 10 | 11 |
|---|---|---|---|---|---|---|---|---|---|
| +3.9 | ○ | ○ | ○ | — | — | — | — | — | — |
| +2.6 | — | ○ | ○ | ○ | — | — | — | — | — |
| +1.3 | — | — | ○ | ○ | ○ | — | — | — | — |
| 0 | — | — | — | ○ | ○ | ○ | — | — | — |
| −1.3 | — | — | — | — | ○ | ○ | ○ | — | — |
| −2.6 | — | — | — | — | — | ○ | ○ | ○ | — |
| −3.9 | — | — | — | — | — | — | ○ | ○ | ○ |

CORRECTION VALUES FOR BEAM[5] TO BEAM[9] ARE CALCULATED AND STORED

RADAR ANGLE CORRECTION METHOD

This application claims priority of Japan Patent Application Number 2003-155625, filed on May 30, 2003.

BACKGROUND OF THE INVENTION

1. Field of the Invention

The present invention relates to a radar unit and, more particularly, to a radar angle correction method for correcting an error in a radar angle caused by the front cover of a radar antenna.

2. Description of the Related Art

As far as radar units to be installed outdoor or mounted in a vehicle are concerned, if the surface of an antenna is exposed to the outside of the radar unit, there is the fear that dust and dirt may adhere to the surface and cause a malfunction of the antenna. For this reason, in general, the antenna is stored in a predetermined container, and the front side of the container oriented in a radio-wave transmitting/receiving direction is shielded with a resin cover that does not cause a drop in the power of radio waves or a distortion of a beam.

For example, an on-vehicle millimeter-wave radar unit (FM-CW radar unit etc.) transmits radio waves to a target so as to measure a distance from the target, a relative speed of the target, and an angle thereof. Herein, a carbonic resin that is superior in mechanical strength and exhibits a small attenuation ratio for radio waves is adopted as a material for the cover.

Moreover, in general, the radar unit mechanically or electronically sweeps a transmitted beam in a predetermined direction, and fits the distribution of received beam power into a quadratic curve so as to calculate the angle of the target.

Product inspection is performed on a finished radar unit including a front cover. A correction value, that is determined based on the result of the inspection and used to minimize a difference in a characteristic of a product from others, is stored in a nonvolatile memory incorporated in the radar unit. The radar unit is then delivered (refer to, for example, Patent Documents 1 and 2).

Patent Document 1: Japanese Unexamined Patent Application Publication No. 2002-22833 (see FIG. 5)

Patent Document 2: Japanese Unexamined Patent Application Publication No. 2003-69355 (see FIG. 2)

Incidentally, the carbonic resin cover is hardly susceptible to radio waves. Nevertheless, the susceptibility varies depending on an angle formed between the cover and the surface of the antenna. Other materials to be made into the antenna cover exhibit similar properties.

The on-vehicle millimeter-wave radar unit and other radar units that move (rotate) the antenna in a predetermined direction and fit a distribution of received power into a theoretical quadratic curve so as to detect the angle of a target, have a drawback that the angle of the target cannot be accurately calculated because a degree of attenuation of a received power varies depending on the angle between the front cover and antenna surface.

The above drawback becomes obvious especially when a radar unit is inspected in order to adjust the axis thereof. When the axis of a radar unit is adjusted on the premises of a narrow factory, the radar unit that is an object of inspection cannot be arranged far from a reference target used to adjust the axis. Therefore, a level variation factor attributable to the angle of the front cover through which a signal passes, is superposed on an angle signal whose received level hardly differs from the original signal level because of the distance of the target. This makes it harder to accurately adjust the axis of the radar unit.

SUMMARY OF THE INVENTION

Accordingly, an object of the present invention is to provide a method of calculating a correction value that is used to correct an error in an angle caused by a cover on the surface of an antenna included in a radar unit, which transmits or receives radio waves to or from a target so as to measure a distance from the target, a relative speed of the target, and an angle thereof.

According to the present invention, the calculated correction value is stored in a memory incorporated in the radar unit. Consequently, the angle of the target can be accurately calculated independently of the angle of rotation of the antenna. Moreover, even when the radar unit is inspected in order to adjust the axis thereof using a reference target located near by, the angle of the antenna can be adjusted accurately.

According to the present invention, there is provided a radar angle correction method comprising the steps of: measuring a peak power of a beam received from a reference target at each of a plurality of radar angles; plotting a theoretical quadratic curve whose peak indicates an average of the each peak power and whose beam width corresponds to a value specified for a radar; adopting the difference between a theoretical value indicated with the theoretical quadratic curve and the received beam power as a correction value with which the received beam is corrected; and subtracting the correction value from the received beam power. Herein, an average of the above difference and the difference of powers of components of the same beam as the received beam which are received at adjoining radar angles, may be adopted as the correction value.

According to the present invention, there is provided a radar angle correction method comprising the steps of: rotating a radar unit, which includes an antenna cover, to each of a plurality of radar angles in turn; swinging an antenna so as to turn the antenna at the same angles as each of the plurality of radar angles in opposite directions; measuring a beam power received from a reference target at each of the plurality of radar angles; and correcting an error in the angle of a radar caused by the antenna cover according to the difference between the received beam powers.

For the correction, the difference between the average of the peak powers received from the reference target at the plurality of radar angles and the beam power received from the reference target measured in each of the plurality of radar angles may be subtracted from the received beam power. Alternatively, the difference between the largest one of the peak powers received from the reference target at the plurality of radar angles and the peak power received from the reference target at each of the plurality of radar angles may be subtracted from the beam power received from the reference target at each of the plurality of radar angles.

BRIEF DESCRIPTION OF THE DRAWINGS

The present invention will be more clearly understood from the description set forth below with reference to the accompanying drawings.

FIG. 8 is a table indicating the contents of the process described in FIG. 3 and FIG. 4.

DESCRIPTION OF THE PREFERRED EMBODIMENTS

Figure 1:
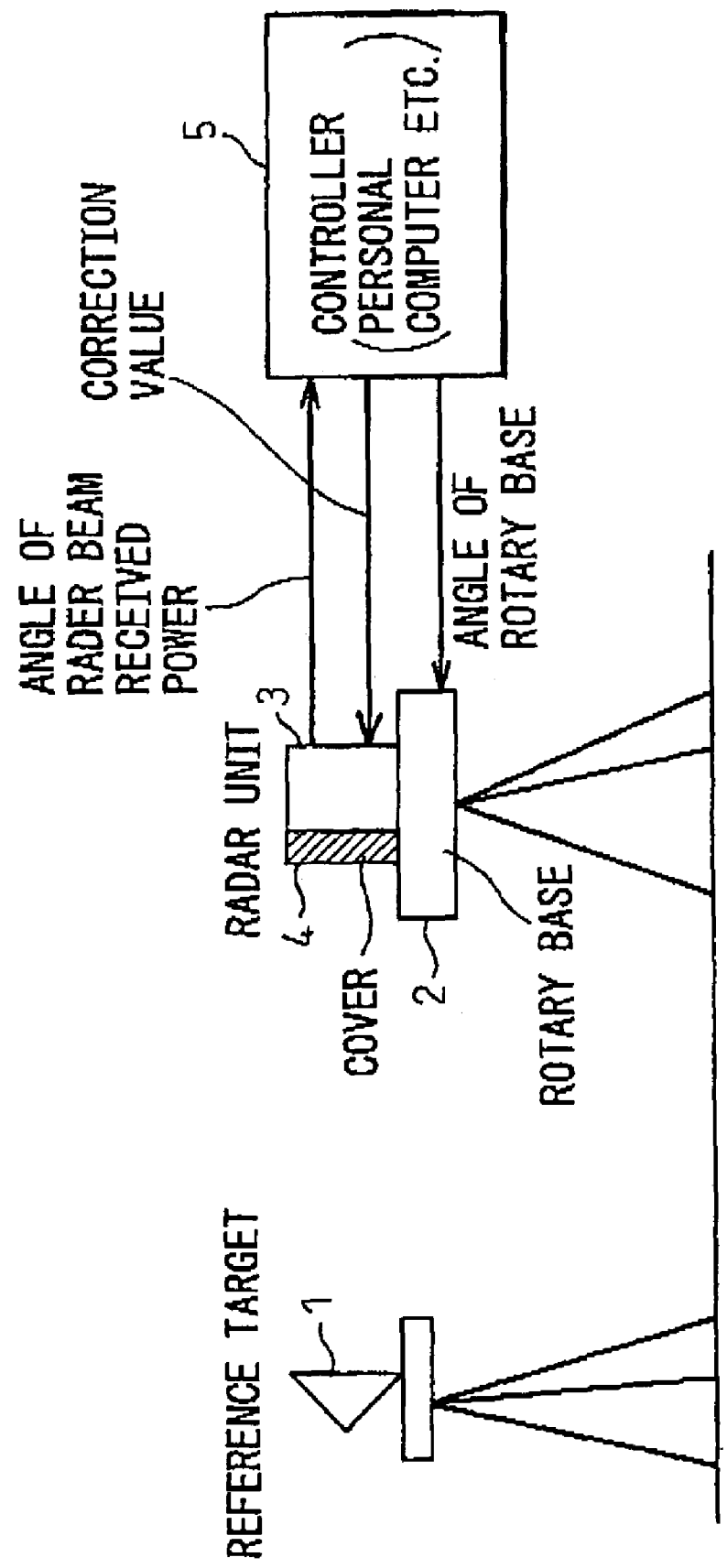
FIG. 1 shows an example of a measuring system that implements a radar angle correction method in accordance with the present invention.

FIG. 1 shows an example of a measuring system that implements a radar angle correction method in accordance with the present invention.

Referring to FIG. 1, a reference target 1 that is a reflecting object as a reference is placed on a stationary base. On the other hand, a radar unit 3 that is an object of measurement is placed on a rotary base 2. An antenna that rotates in a predetermined direction is incorporated in the radar unit 3. A resin cover 4, mounted on the front side of the radar unit 3, passes radio waves which are radiated from the antenna.

A controller 5 realized with a personal computer or the like controls the angle of rotation of the rotary base 2 in units of a predetermined angle, and records the power of radio waves received by the radar unit 3 in association with an angle of rotation. The controller 5 calculates, as described later, a radar angle correction value using the received power associated with each of angles of rotation, and writes the correction value in a nonvolatile memory (EEPROM or the like) incorporated in the radar unit 3.

Figure 2A:
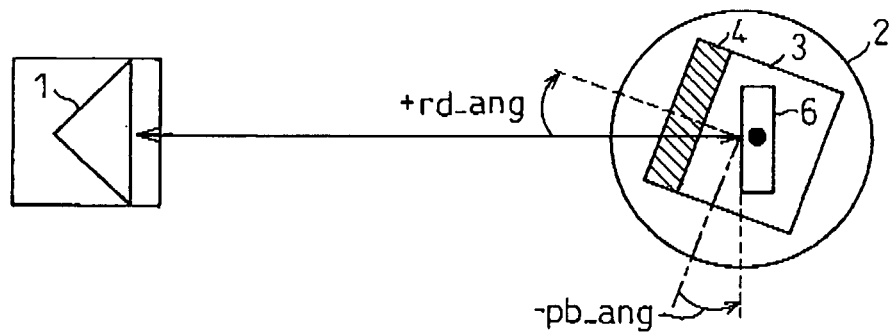
FIG. 2A to FIG. 2C show the principles of correction based on which the present invention corrects the angle of a radar.
Figure 2B:
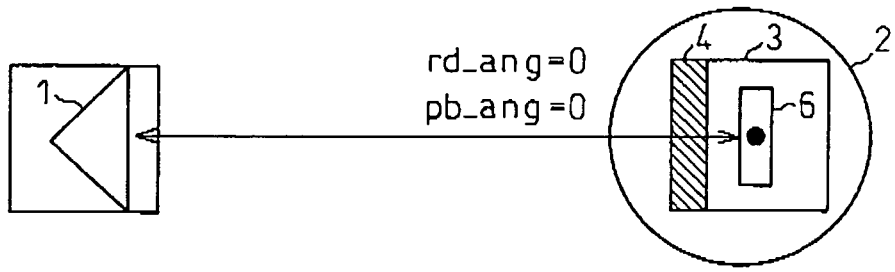
Figure 2C:
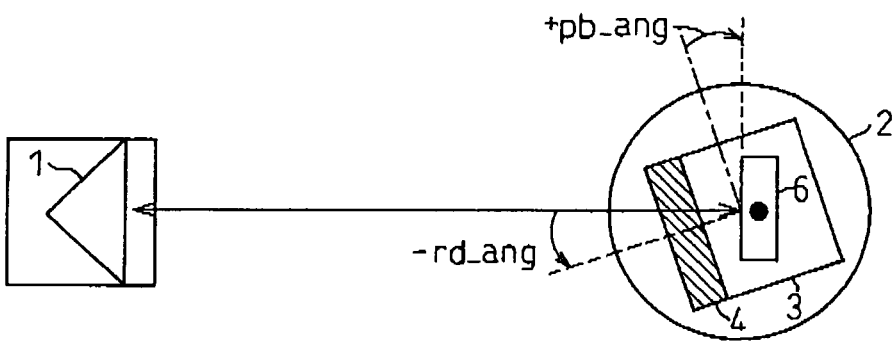

FIG. 2A to FIG. 2C show the principles of correction based on which the present invention corrects the angle of the radar.

FIG. 2A to FIG. 2C show the relationship between the angle of rotation (rd_ang) of the radar unit 3 corresponding to the angle of rotation of the rotary base 2 and the angle of a beam (pb_ang) radiated from a radar 6 incorporated in the radar unit 3.

FIG. 2B shows a case where the rotary base 2 is located at an initial position (rd_ang=0) and the radar 6 is located at an initial position (pb_ang=0). In this case, a beam radiated from the radar 6 is totally reflected by the reference target 1, perpendicularly passed through the cover 4, and received by the radar 6.

On the other hand, FIG. 2A shows a case where the rotary base 2 has rotated clockwise by a predetermined angle (+rd_ang) and the radar 6 has rotated counterclockwise by a predetermined angle (−pb_ang). In this case, the absolute values of the angles of rotation are equal to each other (|+rd_ang|=|−pb_ang|).

Similarly to the case shown in FIG. 2B, the beam radiated from the radar 6 is totally reflected from the reference target 1 and received by the radar 6 as it is. However, the beam passes through the cover 4 at a predetermined angle of incidence (−pb_ang).

Similarly, FIG. 2c shows a case where the rotary base 2 has rotated counterclockwise by a predetermined angle (−rd_ang) and the radar 6 has rotated clockwise by the predetermined angle (+pb_ang). In this case, the absolute values of the angles of rotation are equal to each other (|−rd_ang|=|+pb_ang|).

Similarly to FIG. 2B, the beam radiated from the radar 6 is entirely reflected from the reference target 1 and received by the radar 6 as it is. However, even in this case, the beam passes through the cover 4 at a predetermined angle of incidence (+pb_ang).

Among FIG. 2A to FIG. 2B, the angles at which the beam passes through the cover 4 are different from one another. According to the present invention, a correction value with which an error in an angle caused by the front cover of the antenna is corrected is calculated using the differences among the powers received in the cases shown in FIG. 2A to FIG. 2C that are attributable to the differences among the angles at which the beam passes through the cover. The employment of the correction value makes it possible to calculate the accurate angle of the radar unaffected by the cover 4 or to adjust the axis of the radar.

Referring to FIG. 3 to FIG. 8, an embodiment of the radar angle correction method in accordance with the present invention will be described below.

Figure 3:
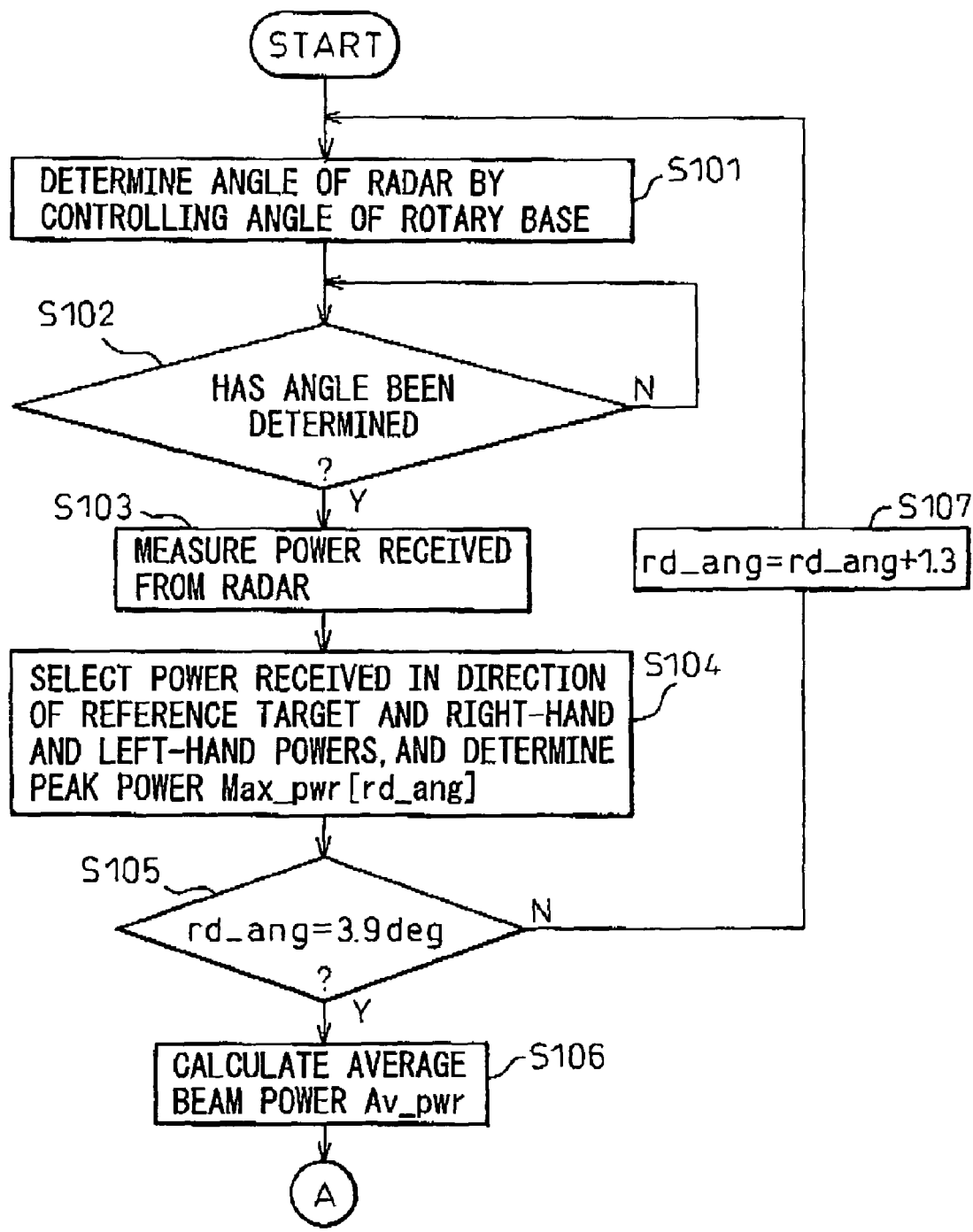
FIG. 3 is a flowchart (1) describing an example of a process pertaining to the radar angle correction method in accordance with the present invention.
Figure 4:
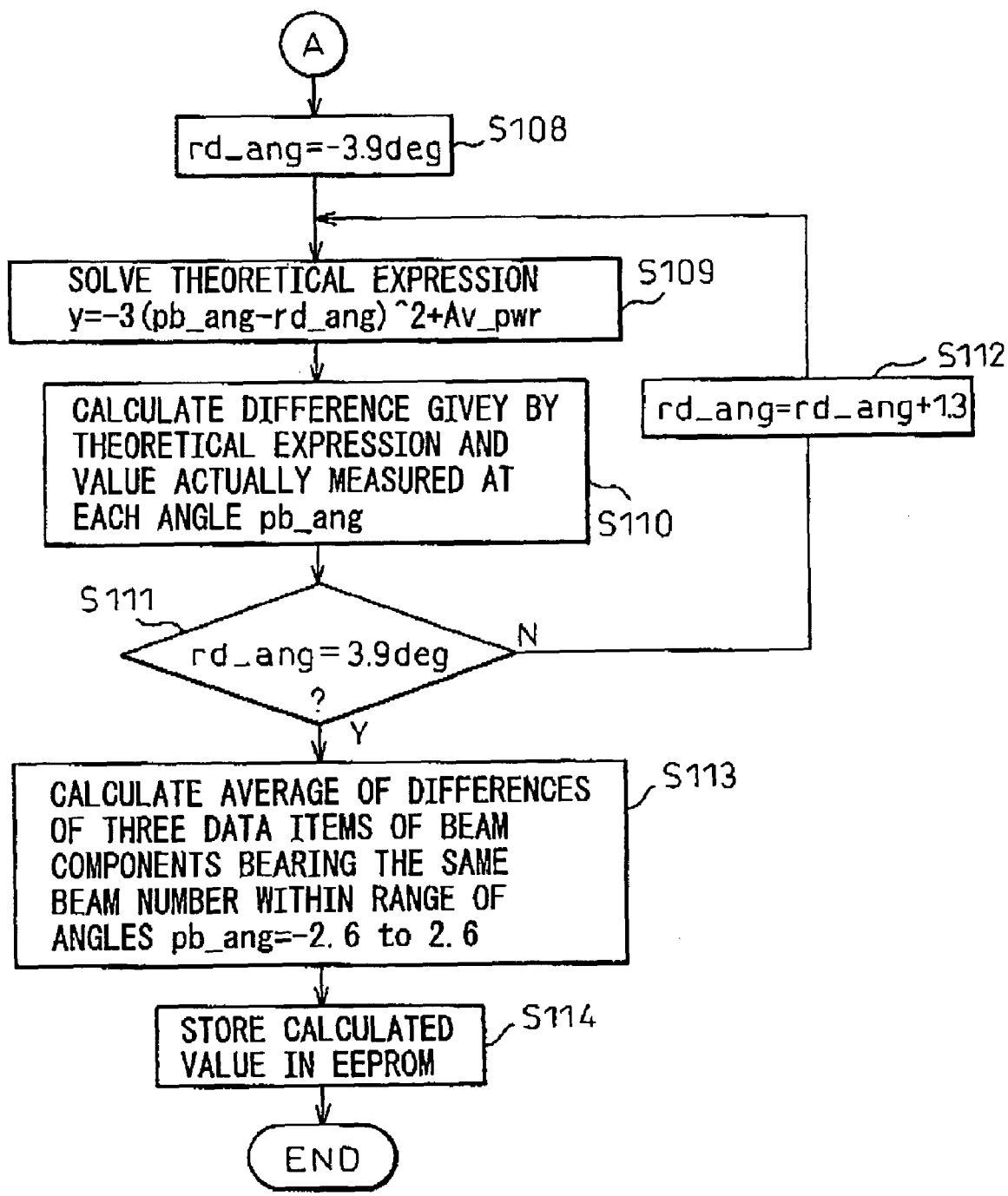
FIG. 4 is a flowchart (2) describing the example of the process pertaining to the radar angle correction method in accordance with the present invention.
Figure 5A:
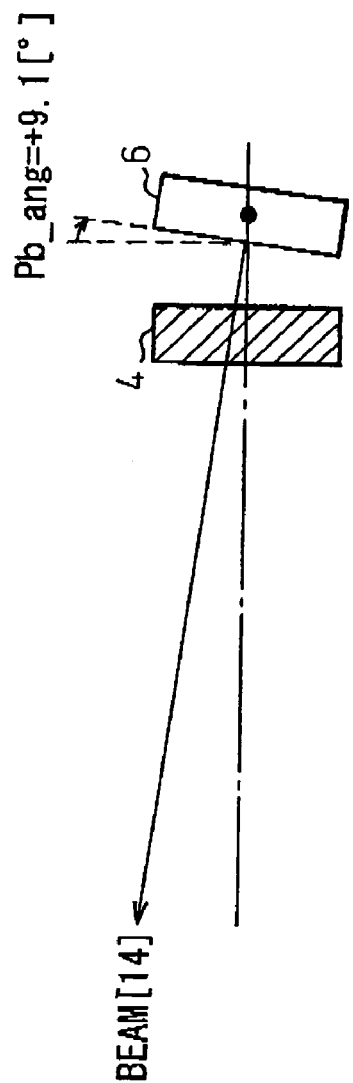
FIG. 5A to FIG. 5C illustratively show the relationship between the angle of a radar beam and a beam number.
Figure 5B:
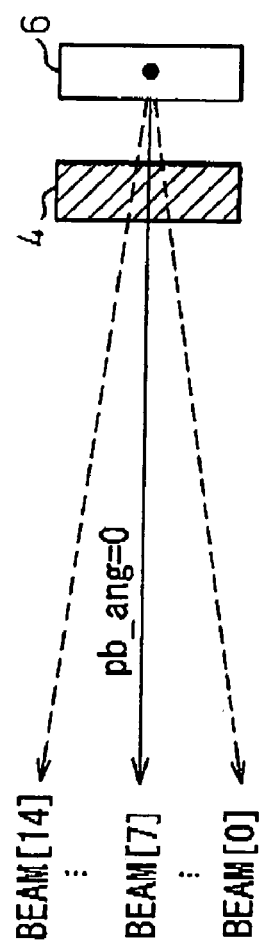
Figure 5C:
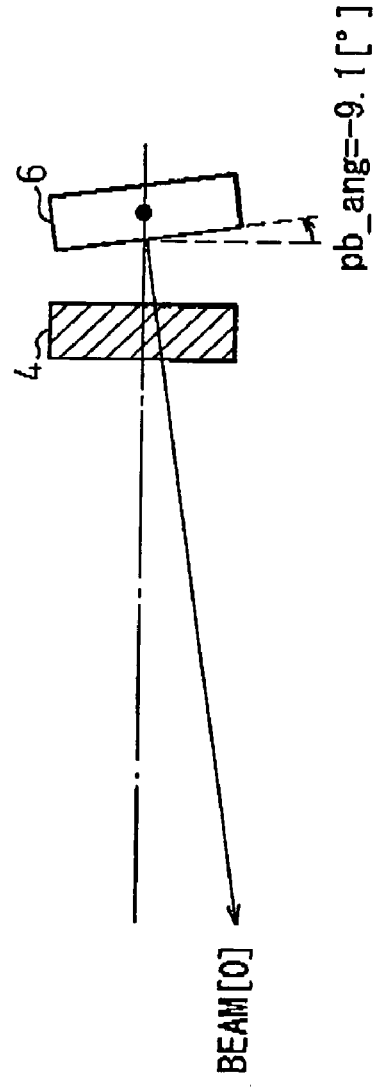
Figure 6:
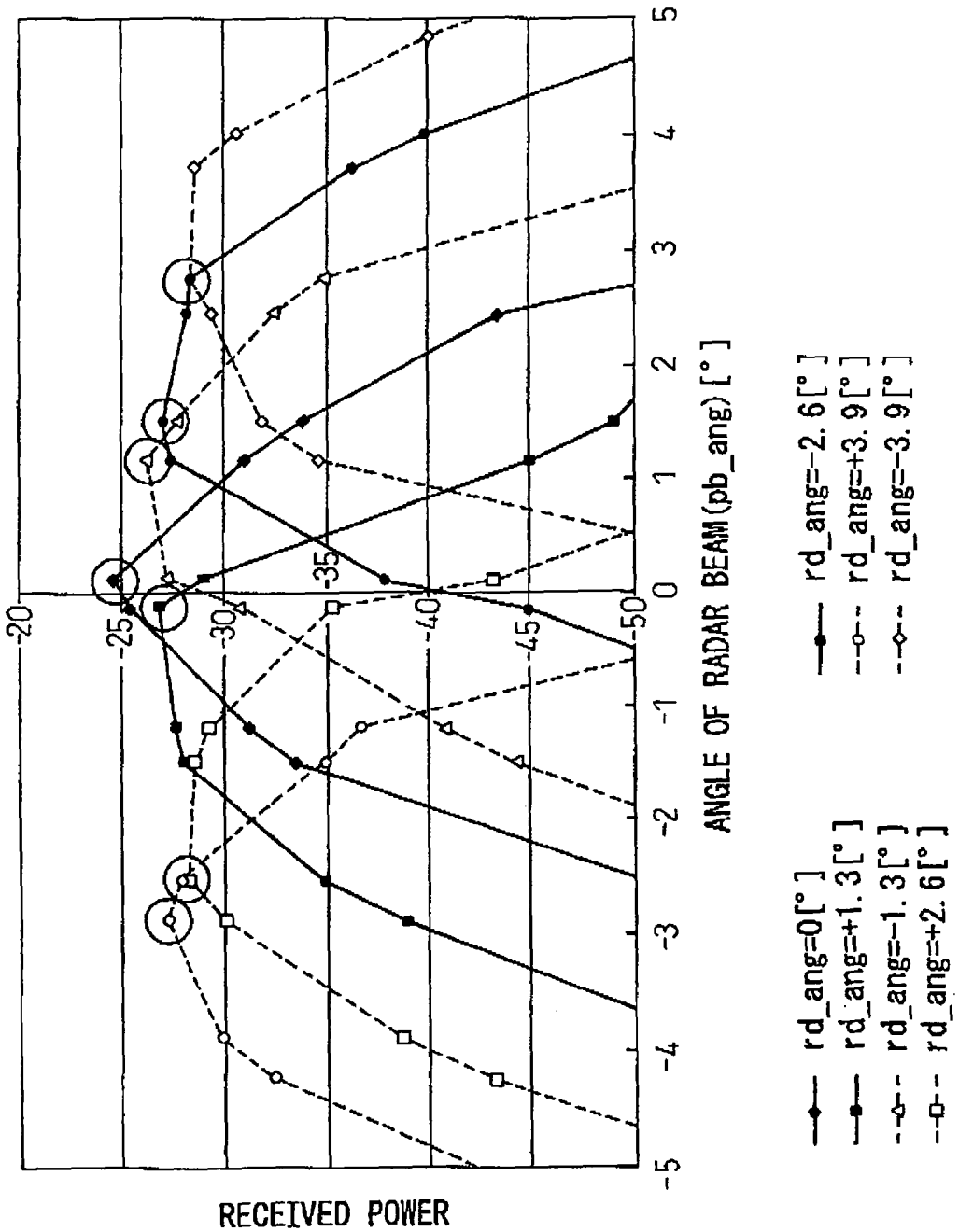
FIG. 6 is a graph indicating an example of measurements of received beam powers.
Figure 7:
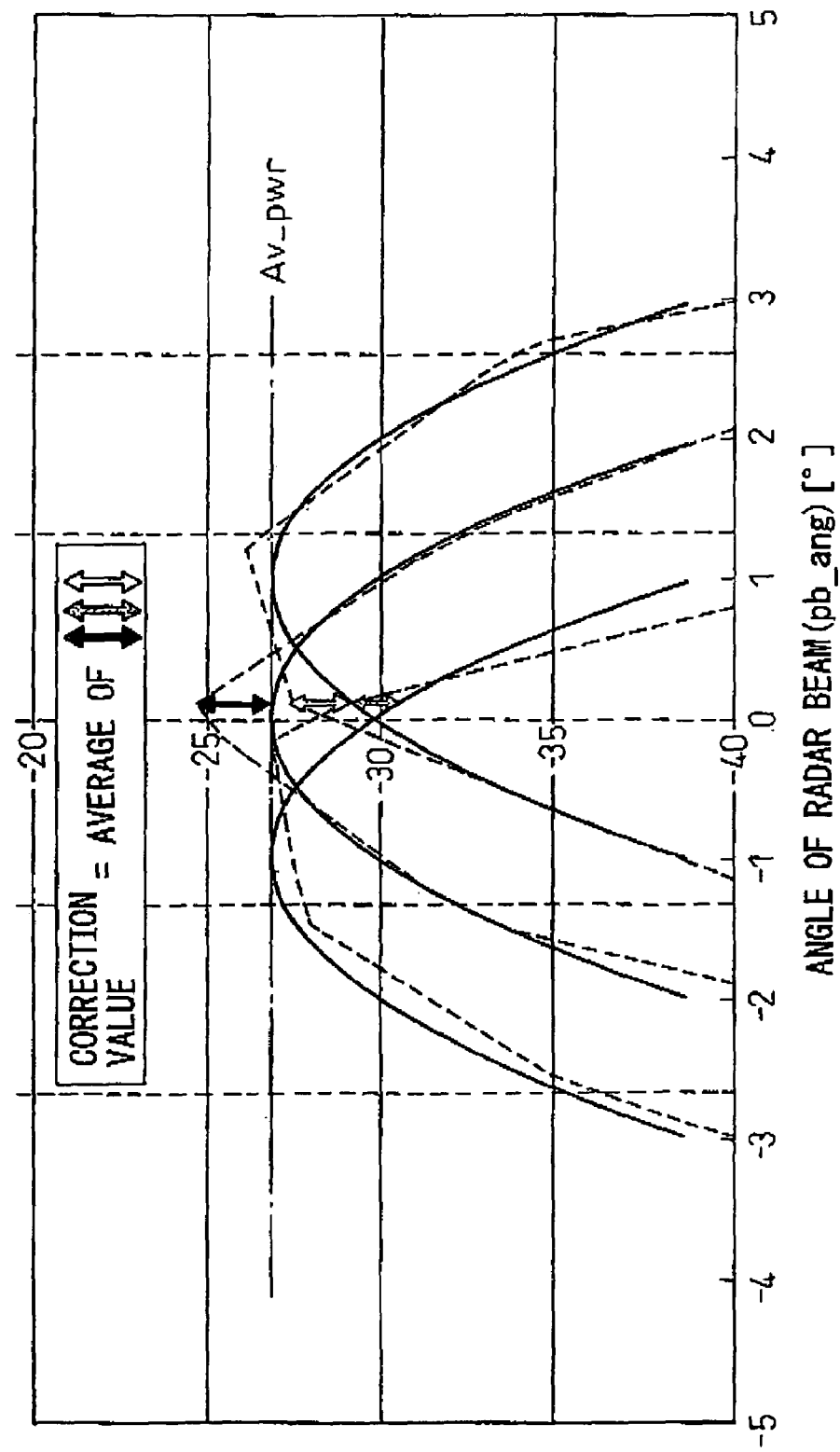
FIG. 7 graphically shows the radar angle correction method (beam [7]) in accordance with the present invention.
Figure 4:
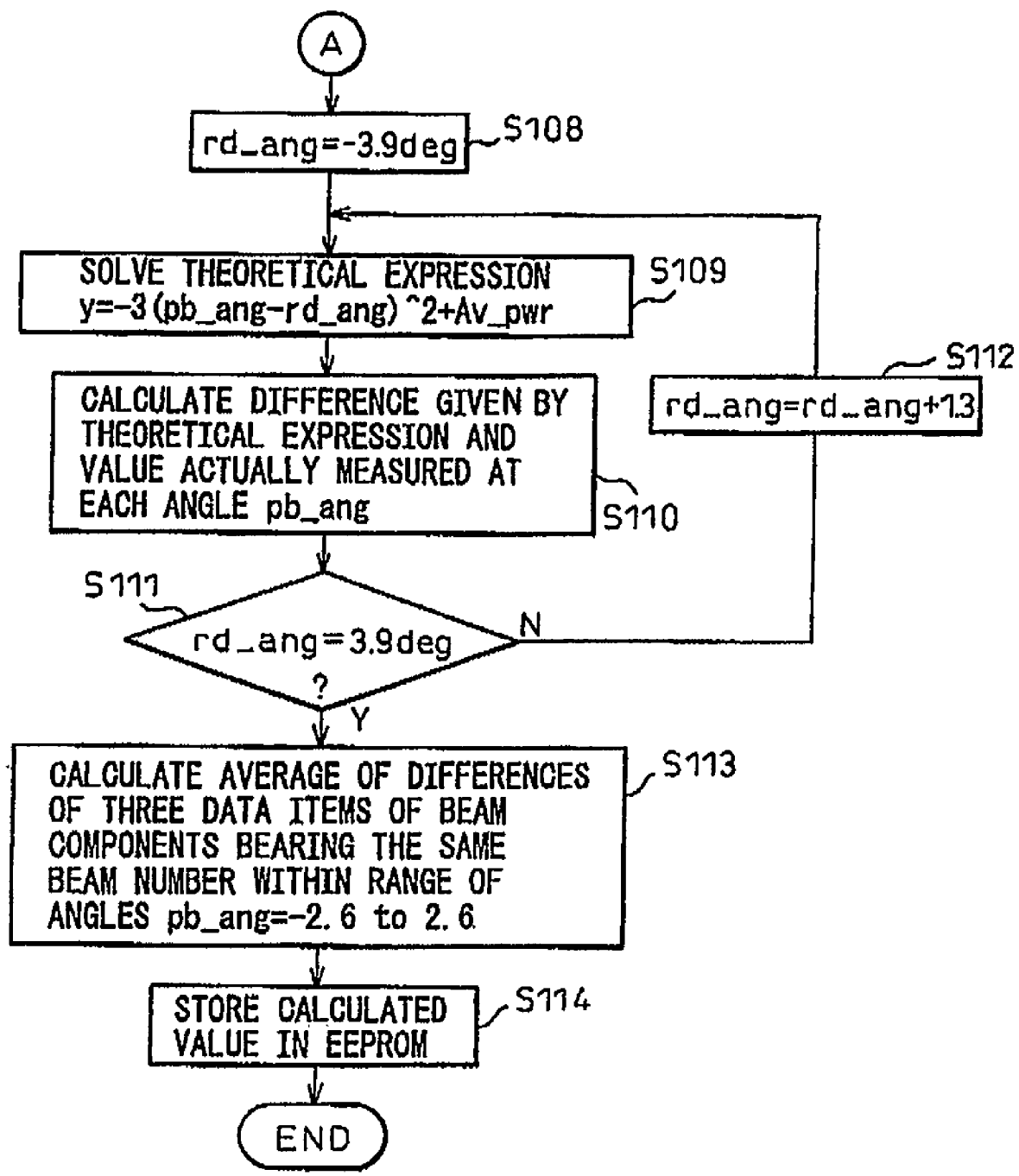
Figure 4:
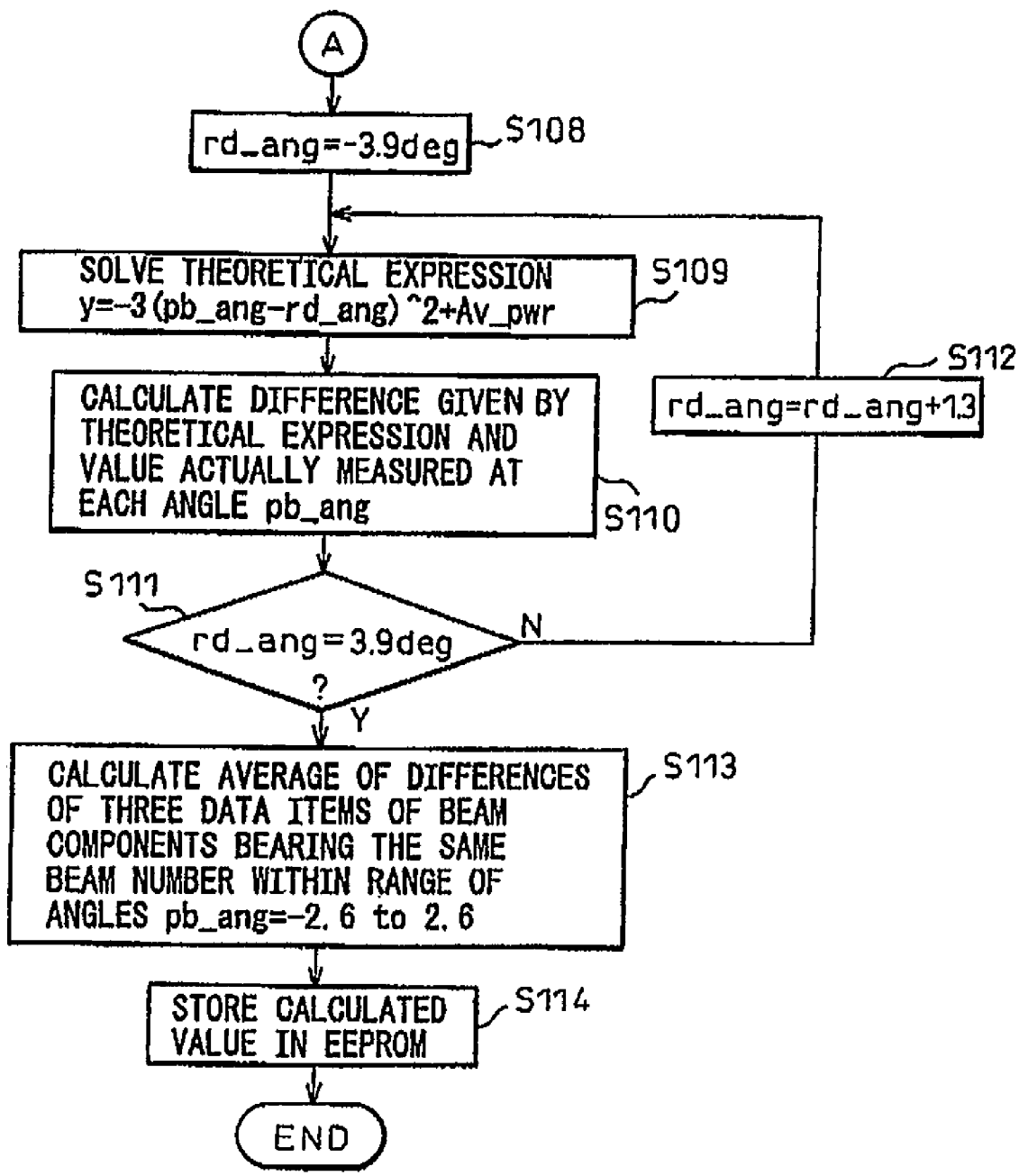

FIG. 3 and FIG. 4 describe an example of a process pertaining to the radar angle correction method in accordance with the present invention. The controller 5 shown in FIG. 1 executes the process. FIG. 5 shows the relationship between the angle of a radar beam (pb_ang) and a beam number. FIG. 6 shows an example of the received beam powers measured using the angle of the radar beam (pb_ang) as a parameter. FIG. 7 and FIG. 8 graphically show the radar angle correction method using the measured values shown in FIG. 6.

A description will be made on the assumption that the conditions for the radar are determined as described below.

(1) Radar range; ±8°

(2) Angle of a radar beam (pb_ang): −9.1°, −7.8°, −6.5°, −5.2°, −3.9°, −2.6°, −1.3°, 0°, 1.3°, 2.6°, 3.9°, 5.2°, 6.5°, 7.8°, and 9.1°

Fifteen angles are defined for a radar beam in units of 1.3° in order to cover the radar range. Moreover, as shown in FIG. 5A to FIG. 5C, a radar beam having an angle of −9.1° is defined as beam [0], a radar beam having an angle of −7.8° is defined as beam [1], etc., a radar beam having an angle of 0° is defined as beam [7], etc., and a radar beam having an angle of 9.1° is defined as beam [14]. Consequently, for example, beam [7] signifies a beam passing perpendicularly through the cover 4, and beam [8] signifies a beam passing through the cover 4 +1.3° obliquely relative to the perpendicular direction.

(3) Angle of rotation of the radar (rd_ang): −3.9°, −2.6°, −1.3°, 0°, 1.3°, 2.6°, and 3.9°

Seven angles of rotation are defined in units of 1.3°.

Next, a description will be made of measuring a received beam according to the present invention.

As described in FIG. 3, the controller 5 controls the rotary base 2 and determines the angle of rotation of the radar unit 3 placed on the rotary base 2 (S101). At this step, the angle of rotation of the radar is set to −3.9° that corresponds to the direction of the reference target.

Then, measuring a power received by the radar is started. The angle of rotation of the radar is sequentially incremented by 1.3° from −3.9° to +3.9° (S101 to S107).

During the measurement, as in an example shown in FIG. 8, a received beam power is stored in association with the angle of rotation of the radar (rd_ang −3.9° to +3.9°). Among three beam components of a beam received at each angle of rotation including a beam component whose angle corresponds to the direction of the reference target and its right-hand and left-hand beam components, a beam component exhibiting the largest power (Max_pwr[rd_ang]) is selected and stored (S104). For example, if the angle of rotation of the radar rd_ang is set to 0° listed in FIG. 8, beam [7] is a beam component whose angle corresponds to the direction of the reference target and beams 6 and 8 are its right-hand and left-hand beam components. Among the beam powers (pwr[6], pwr[7], and pwr[8]), the largest power (pwr [7]) (within a rectangle drawn with a dot-dash line in FIG. 8) is selected as a peak beam power (Max_pwr [0]). Likewise, seven peak beam powers Max_pwr[−3.9] to Max_pwr[+3.9] are selected.

FIG. 6 shows an example of data acquired by measuring a received power in relation to an angle of a radar beam (pb_ang) using an angle of rotation of the radar (rd_ang −3.9 to +3.9) as a parameter. FIG. 6 demonstrates as an example a characteristic that when the angle of rotation of the radar rd_ang is 0°, the received power of a beam component corresponding to beam 7 (pb_ang 0°) is a peak power. Moreover, when the angle of rotation of the radar rd_ang is −1.3°, the received power of a beam component corresponding to beam [8] (pb_ang +1.3°) is a peak power. FIG. 8 also shows the relationship.

Referring back to the flowchart of FIG. 3, an average beam power (Av_pwr) that is an average of the peak beam powers Max_pwr[−3.9] to Max_pwr[+3.9] is calculated according to the expression (1) below (S106).

$$Av\_pwr = (Max\_pwr[-3.9] + Max\_pwr[-2.6] + etc., + Max\_pwr[3.9])/7 \quad (1)$$

According to the continuing flowchart of FIG. 4, a theoretical quadratic curve which has a beam width of 2.8° and whose peak corresponds to the average beam power (Av_pwr) is plotted for each of the angles of rotation of the radar (rd_ang=−3.9 to +3.9) according to the expression (2) below (S108 to S111).

$$y = -3(pb\_ang + rd\_ang)^2 + Av\_pwr \quad (2)$$

A difference between a value indicated with the calculated theoretical quadratic curve and actually measured data (FIG. 6) is calculated (S110). Within a range of angles of a radar beam (pb_ang=−2.6 to +2.6) (beam [5] to beam [9]) to which a correction value is applied in reality, an average of differences of three data items, that is, an average of differences of actually measured powers of three beam components bearing the same beam number is calculated as a correction value for the beam components bearing the same beam number of each of beam [5] to beam [9] (S113). The result of calculation of the average of differences of actually measured powers of five beam components bearing the same beam number is stored as a correction value for each of beam [5] to beam [9] in the EEPROM incorporated in the radar unit (S114).

FIG. 7 graphically shows an example of correction by taking beam [7] for instance.

In the drawing, an average beam power (Av_pwr) calculated according to the expression (1) is indicated with a dot-dash line. Theoretical quadratic curves that indicate powers received at three angles of rotation of the radar (rd_ang=−1.3, 0, or +1.3 [°]) and calculated according to the expression (2) and that indicate as the peak values the average beam power are drawn with solid lines. Loci of actually measured data items (FIG. 6) associated with the theoretical quadratic curves are indicated with dashed lines. Herein, as indicate with frames drawn with dashed lines, a difference between the data of beam [7] actually measured at each of the three angles of rotation of the radar and an associated theoretical value is calculated (S110 in FIG. 4). An average of the three differences is adopted as a correction value with which the actually measure data of beam 7 is corrected (S113 in FIG. 4).

When the axis of the radar is adjusted, a value calculated by subtracting the correction value for each beam from a power received is used to calculate the angle of a target. Assuming that uncorrected data actually measured at a certain angle of a radar beam pb_ang is z(pb_ang) and corrected data is Z(pb_ang), the expression (3) below is established.

$$Z(pb\_ang) = z(pb\_ang) - (\Delta^- + \Delta^0 + \Delta^+)/3 \quad (3)$$

where $\Delta$ denotes a difference calculated by subtracting a theoretical value y(pb_ang, rd_ang), which is provided as the expression (2), from actually measured data x(pb_ang, rd_ang).

Referring to FIG. 7, uncorrected data z(0) of beam [7] (pb_ang=0°) is corrected into corrected data Z(0)=z(0)/($\Delta^-$+$\Delta^0$+$\Delta^+$)/3 where $\Delta^-$ denotes x(0,+1,3)−y(0,−1,3), $\Delta^0$ denotes x(0,0)−y(0,0), and $\Delta^+$ denotes x(0,+1,3)−y(0,+1,3).

According to the present invention, measured data items of beams of beam [5] to beam [9] are corrected to be fitted into respective theoretical quadratic curves whose peak values are constant (Av_pwr). The adverse effect of the cover 4 is removed from the beams, and the angle of a target can be accurately calculated independently of the angle of rotation of the antenna. As is apparent from FIG. 2, according to the present invention, an angle of a radar beam (pb_ang) and an angle of rotation of the radar (rd_ang) have mutually opposite signs but have the same absolute value. Consequently, a correction value for an angle of a radar beam to be stored in the EEPROM may have the sign inversed and be recorded as a correction value for an angle of rotation of the radar.

An easier method may be adopted in order to calculate a correction value. For example, the theoretical quadratic curve need not be employed and a value (Max_pwr [rd_ang]−Av_pwr) calculated by merely subtracting an average beam power (Av_pwr) from a peak beam power measured at each angle of rotation of the radar may have the sign thereof inverted and be stored as a correction value for an associated angle of a radar beam in the EEPROM.

Otherwise, a value (Max_pwr[rd_ang]−M_Max_pwr) calculated by subtracting the smallest one (M_Max_pwr) of peak beam powers (Max_pwr[rd_ang]) from each peak beam power may have the sign thereof inversed and be recorded as a correction value for an associated angle of a radar beam in the EEPROM.

As mentioned above, a correction value calculated according to the present invention is stored in a memory incorporated in a radar unit. Consequently, the angle of a target can be accurately calculated independently of an angle of rotation of an antenna. Moreover, even when a reference target located near by is used to inspect a radar unit for adjustment of the axis of the radar unit, the angle of the radar unit can be accurately adjusted.

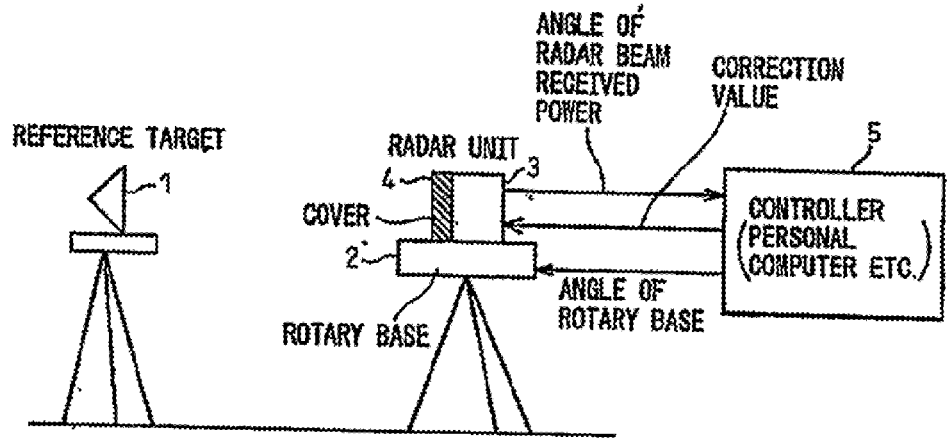

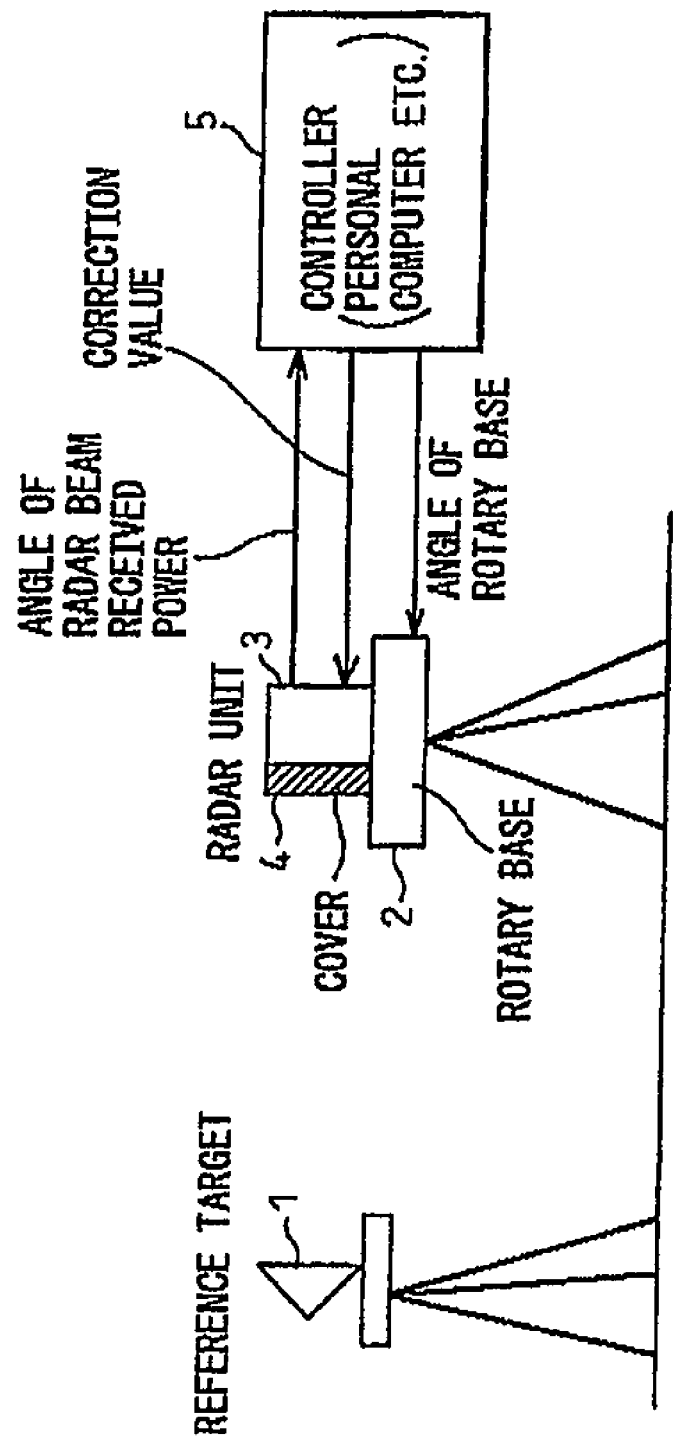

The invention claimed is:

1. A radar angle correction method at each of a plurality of radar angles comprising the steps of:

calculating a peak power of a beam received from a reference target;

plotting a theoretical quadratic curve whose peak indicates an average of peak powers;

adopting a difference between a theoretical value indicated by the theoretical quadratic curve and a received beam power as a correction value for the received beam; and subtracting the correction value from the received beam power.

2. A radar angle correction method according to claim 1, further comprising a step of adopting, as a correction value, an average among the difference and differences of powers of components of the beam which are received at adjoining radar angles.

3. A radar angle correction method comprising the steps of:

rotating a radar unit, which includes an antenna cover, to each of a plurality of radar angles in turn;

swinging an antenna included in said radar unit;

measuring a beam power received from a reference target at each of the plurality of radar angles; and correcting an error in the angle of a radar caused by said antenna cover according to differences of received beam powers.

4. A radar angle correction method according to claim 3, wherein the correction is achieved by subtracting from the received beam power a difference between a peak power received from said reference target at each of the plurality of radar angles and an average of peak powers received from said reference target at the respective radar angles.

5. A radar angle correction method according to claim 3, wherein the correction is achieved by subtracting a difference between a peak power received from said reference target at each of the plurality of radar angles and the smallest one of the peak powers received from said reference target at the respective radar angles from the beam power received from said reference target at each of the radar angles.

* * * * *

UNITED STATES PATENT AND TRADEMARK OFFICE
CERTIFICATE OF CORRECTION

| | | |
|---|---|---|
| PATENT NO. | : 7,046,191 B2 | Page 1 of 4 |
| APPLICATION NO. | : 10/856587 | |
| DATED | : May 16, 2006 | |
| INVENTOR(S) | : Tokutsu et al. | |

It is certified that error appears in the above-identified patent and that said Letters Patent is hereby corrected as shown below:

On the title page, showing the illustrative figure, should be deleted and substitute therefore the attached title page.

In the Drawings

FIG. 1, Sheet 1 of 8    Delete Drawing Sheet 1 and substitute therefore the Drawing Sheet, consisting of Fig. 1, as shown on the attached page FIG. 4, Sheet 4 of 8
Ref No. S110    Delete Drawing Sheet 4 and substitute therefore the Drawing Sheet, consisting of Fig. 4, as shown on the attached page

On the Title Page

(56) References Cited
U.S. Patent Documents    Delete "B1",
Insert --B2--

Signed and Sealed this

Twenty-sixth Day of June, 2007

JON W. DUDAS
*Director of the United States Patent and Trademark Office*

(12) United States Patent
Tokutsu et al.

(10) Patent No.: US 7,046,191 B2
(45) Date of Patent: May 16, 2006

(54) RADAR ANGLE CORRECTION METHOD

(75) Inventors: Masahiro Tokutsu, Kobe (JP); Tokio Shinagawa, Kobe (JP)

(73) Assignee: Fujitsu Ten Limited, Kobe (JP)

(*) Notice: Subject to any disclaimer, the term of this patent is extended or adjusted under 35 U.S.C. 154(b) by 0 days.

(21) Appl. No.: 10/856,587

(22) Filed: May 28, 2004

(65) Prior Publication Data
US 2004/0239557 A1 Dec. 2, 2004

(30) Foreign Application Priority Data
May 30, 2003 (JP) ............... 2003-155625

(51) Int. Cl.
G01S 7/40 (2006.01)

(52) U.S. Cl. ............ 342/165; 342/173; 342/174

(58) Field of Classification Search ............ 342/165, 342/173, 174, 70, 71, 72; 343/872
See application file for complete search history.

(56) References Cited

U.S. PATENT DOCUMENTS 6,844,843 B1 * 1/2005 Ishii et al. ............ 342/165

FOREIGN PATENT DOCUMENTS

| JP | 2002-22833 | 1/2002 |
| JP | 2003-69355 | 3/2003 |

OTHER PUBLICATIONS

Patent Abstract of Japan Publication No. 2002022833 A, Published Jan. 23, 2002 in the name of Hoashi Yoshiaki.
Patent Abstract of Japan Publication No. 2003069355 A, Published Mar. 7, 2003 in the name of Kamiide Koji.

* cited by examiner

Primary Examiner—Daniel Pihulic
(74) Attorney, Agent, or Firm—Christie, Parker and Hale, LLP

(57) ABSTRACT

The present invention relates to a radar unit and provides a radar angle correction method for correcting an error in a radar angle caused by the front cover of an antenna. The radar angle correction method comprises the steps of: measuring a peak power of a beam received from a reference target at each of a plurality of radar angles; plotting a theoretical quadratic curve whose beam width corresponds to a value specified for the radar and whose peak indicates an average of peak values; adopting a difference between a theoretical value indicated by the theoretical quadratic curve and a received beam power as a correction value with which the received beam is corrected; and subtracting the correction value from the received beam power.

5 Claims, 8 Drawing Sheets

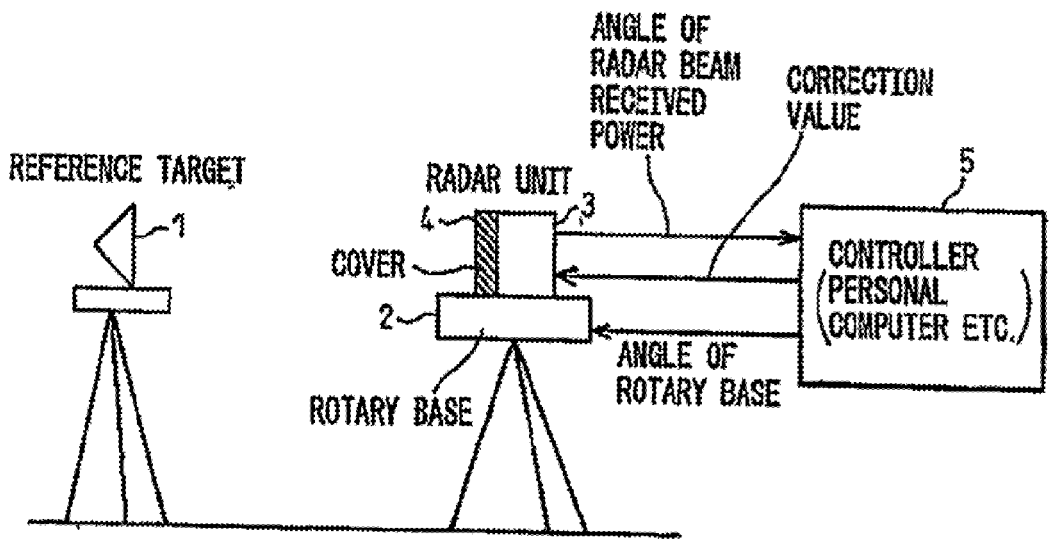

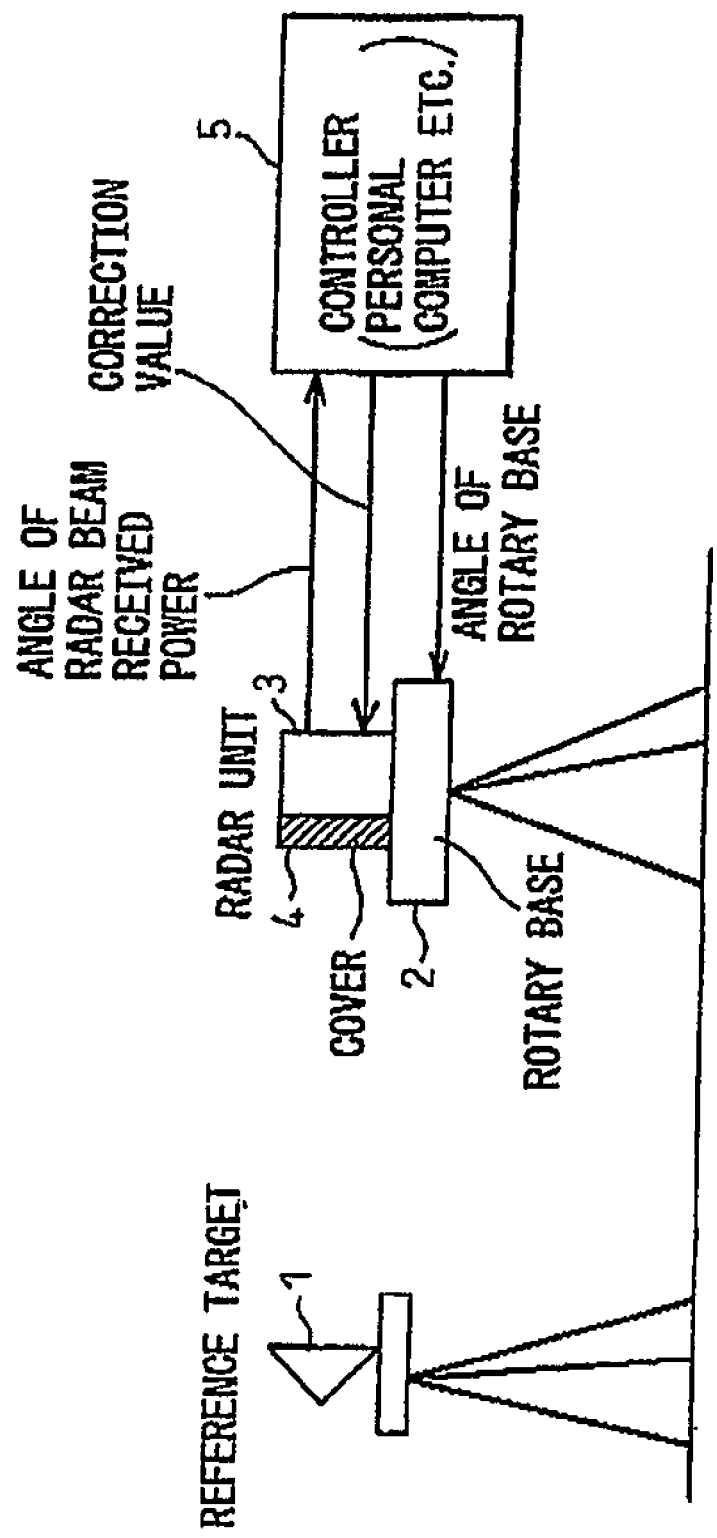

UNITED STATES PATENT AND TRADEMARK OFFICE
CERTIFICATE OF CORRECTION

| | | |
|---|---|---|
| PATENT NO. | : 7,046,191 B2 | |
| APPLICATION NO. | : 10/856587 | |
| DATED | : May 16, 2006 | |
| INVENTOR(S) | : Tokutsu et al. | |

It is certified that error appears in the above-identified patent and that said Letters Patent is hereby corrected as shown below:

The title page showing the illustrative figure should be deleted to be replaced with the attached title page.

On the Title Page line 1, item

(56) References Cited          Delete "B1",
U.S. Patent Documents          Insert --B--

In the Drawings

FIG. 1, Sheet 1 of 8           Delete Drawing Sheet 1 and substitute therefore the
                               Drawing Sheet, consisting of Fig. 1, as shown on the
                               attached page FIG. 4, Sheet 4 of 8           Delete Drawing Sheet 4 and substitute therefore the
Ref No. S110                   Drawing Sheet, consisting of Fig. 4, as shown on the
                               attached page Signed and Sealed this Twenty-fourth Day of July, 2007

JON W. DUDAS
*Director of the United States Patent and Trademark Office*

United States Patent
Tokutsu et al.

(10) Patent No.: US 7,046,191 B2
(45) Date of Patent: May 16, 2006

(54) RADAR ANGLE CORRECTION METHOD

(75) Inventors: Masahiro Tokutsu, Kobe (JP); Tokio Shinagawa, Kobe (JP)

(73) Assignee: Fujitsu Ten Limited, Kobe (JP)

(*) Notice: Subject to any disclaimer, the term of this patent is extended or adjusted under 35 U.S.C. 154(b) by 0 days.

(21) Appl. No.: 10/856,587

(22) Filed: May 28, 2004

(65) Prior Publication Data
US 2004/0239557 A1 Dec. 2, 2004

(30) Foreign Application Priority Data
May 30, 2003 (JP) .................. 2003-155625

(51) Int. Cl.
GO1S 7/40 (2006.01)

(52) U.S. Cl. .................. 342/165; 342/173; 342/174

(58) Field of Classification Search .......... 342/165, 342/173, 174, 70, 71, 72; 343/872
See application file for complete search history.

(56) References Cited

U.S. PATENT DOCUMENTS
6,844,843 B1 * 1/2005 Ishii et al. .................. 342/165

FOREIGN PATENT DOCUMENTS
JP 2002-22833 1/2002
JP 2003-69355 3/2003

OTHER PUBLICATIONS
Patent Abstract of Japan Publication No. 2002022833 A, Published Jan. 23, 2002 in the name of Hoashi Yoshiaki.
Patent Abstract of Japan Publication No. 2003069355 A, Published Mar. 7, 2003 in the name of Kamiide Koji.

* cited by examiner

Primary Examiner—Daniel Pihulic
(74) Attorney, Agent, or Firm—Christie, Parker and Hale, LLP

(57) ABSTRACT

The present invention relates to a radar unit and provides a radar angle correction method for correcting an error in a radar angle caused by the front cover of an antenna. The radar angle correction method comprises the steps of: measuring a peak power of a beam received from a reference target at each of a plurality of radar angles; plotting a theoretical quadratic curve whose beam width corresponds to a value specified for the radar and whose peak indicates an average of peak values; adopting a difference between a theoretical value indicated by the theoretical quadratic curve and a received beam power as a correction value with which the received beam is corrected; and subtracting the correction value from the received beam power.

5 Claims, 8 Drawing Sheets